US012574976B2

(12) United States Patent
Huang

(10) Patent No.: US 12,574,976 B2
(45) Date of Patent: Mar. 10, 2026

(54) SESSION ESTABLISHMENT METHOD, TERMINAL, AND COMMUNICATION SYSTEM

(71) Applicant: Huawei Technologies Co., Ltd., Shenzhen (CN)

(72) Inventor: Wei Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 375 days.

(21) Appl. No.: 18/043,645

(22) PCT Filed: Aug. 4, 2021

(86) PCT No.: PCT/CN2021/110414
§ 371 (c)(1),
(2) Date: Mar. 1, 2023

(87) PCT Pub. No.: WO2022/052673
PCT Pub. Date: Mar. 17, 2022

(65) Prior Publication Data
US 2023/0284294 A1    Sep. 7, 2023

(30) Foreign Application Priority Data

Sep. 8, 2020    (CN) .......................... 202010935583.2

(51) Int. Cl.
*H04W 76/10* (2018.01)
*H04W 4/12* (2009.01)
(Continued)

(52) U.S. Cl.
CPC ............. *H04W 76/10* (2018.02); *H04W 4/12* (2013.01); *H04W 28/26* (2013.01); *H04W 76/30* (2018.02)

(58) Field of Classification Search
CPC ....... H04W 76/10; H04W 4/12; H04W 28/26; H04W 76/30; H04W 76/14; H04W 76/38
See application file for complete search history.

(56) References Cited

U.S. PATENT DOCUMENTS

2010/0185744 A1 * 7/2010 Coronado ............. G06F 13/385
709/213
2013/0005316 A1 * 1/2013 Bienn ..................... H04W 4/16
455/417

(Continued)

FOREIGN PATENT DOCUMENTS

| CN | 106688221 A | 5/2017 | |
| CN | 112671674 A * | 4/2021 | .......... H04L 65/1104 |
| WO | WO-2006034638 A1 * | 4/2006 | .......... H04L 65/1006 |

OTHER PUBLICATIONS

3GPP TS 24.229 V16.6.0 (Jun. 2020), 3rd Generation Partnership Project;Technical Specification Group Core Network and Terminals; IP multimedia call control protocol based on Session Initiation Protocol (SIP) and Session Description Protocol (SDP); Stage 3 (Release 16), total 675 pages.

(Continued)

*Primary Examiner* — Michael A Keller
(74) *Attorney, Agent, or Firm* — Slater Matsil, LLP

(57) ABSTRACT

This application provides a session establishment method, a terminal, and a communication system. A first terminal sends, to a second terminal, a session request message used to request to establish a session; and the second terminal sends a session response message to the first terminal based on the session request message, and start a second timer. The first terminal starts a first timer after receiving the session response message. When the first terminal completes resource reservation for the session before duration recorded by the first timer reaches preset first duration, the first terminal sends a resource reservation completion acknowl- (Continued)

edgment message to the second terminal. The second terminal sends a ringing message to the first terminal if the second terminal completes resource reservation for the session before duration recorded by the second timer reaches preset second duration. The second duration is longer than the first duration.

20 Claims, 11 Drawing Sheets

(51) Int. Cl.
  *H04W 28/26*          (2009.01)
  *H04W 76/30*          (2018.01)

(56)                    References Cited

U.S. PATENT DOCUMENTS

2015/0358361 A1* 12/2015 Balasaygun ........ H04L 65/1069
                                                709/228
2020/0356149 A1* 11/2020 Chae ..................... G06F 1/3287

OTHER PUBLICATIONS

IR.92-v15.0-4, "IMS Profile for Voice and SMS Version 15.0," May 14, 2020, total 70 pages.

* cited by examiner

SESSION ESTABLISHMENT METHOD, TERMINAL, AND COMMUNICATION SYSTEM

CROSS-REFERENCE TO RELATED APPLICATIONS

This application is a national stage of International Application No. PCT/CN2021/110414, filed on Aug. 4, 2021, which claims priority to Chinese Patent Application No. 202010935583.2, filed on Sep. 8, 2020. Both of the aforementioned applications are hereby incorporated by reference in their entireties.

TECHNICAL FIELD

The present invention relates to the communication field, and in particular, to a session establishment method, a terminal, and a communication system.

BACKGROUND

A terminal may be connected to an internet protocol multimedia subsystem (internet protocol multimedia subsystem, IMS) through a mobile communication network that is accessed by the terminal. Different terminals may establish a session with each other by using an IMS connected to each of the terminals and perform, based on the successfully established session, media services, for example, exchanging media data such as a text, a video, and a voice.

A terminal requesting to establish a session may be referred to as a calling terminal, and a terminal requested to establish a session may be referred to as a called terminal. If the calling terminal or the called terminal fail to successfully establish a dedicated bearer with a mobile communication network that is accessed by the calling terminal or the called terminal, a session cannot be successfully established between the calling terminal and the called terminal. The dedicated bearer meets a specific quality of service (quality of service, QoS) policy, and is used to transmit media data exchanged between the calling terminal and the called terminal after the session is successfully established. In addition, a process of establishing a dedicated bearer is referred to as resource reservation for a session.

Generally, if the calling terminal fails to complete resource reservation for the session quickly, the calling terminal may switch to another mobile communication network, and resend a session request message used to request to establish a session to the called terminal. For the called terminal, if the called terminal fails to complete resource reservation for the session quickly, the called terminal terminates establishment of the session between the calling terminal and the called terminal.

SUMMARY

Embodiments of this application provide a session establishment method, a terminal, and a communication system, to improve a success rate of establishing a session between a calling terminal and a called terminal.

According to a first aspect, a communication system is provided. The communication system includes a first terminal and a second terminal. The first terminal may send, to the second terminal, a session request message used to request to establish a session; and the second terminal may send a session response message to the first terminal based on the session request message, and start a second timer. The first terminal may start a first timer after receiving the session response message. When the first terminal completes resource reservation for the session before duration recorded by the first timer reaches preset first duration, the first terminal sends a resource reservation completion acknowledgment message to the second terminal. After the second terminal receives the resource reservation completion acknowledgment message, if the second terminal completes resource reservation for the session before duration recorded by the second timer reaches preset second duration, the second terminal sends a ringing message to the first terminal. The second duration is longer than the first duration.

In this way, compared with the first terminal serving as a calling terminal, the second terminal serving as a called terminal has a longer time to complete resource reservation for the session. A mobile communication network that is accessed by the called terminal may support, in a longer time by releasing more available computing resources and network resources, retransmitting a lost data packet, and the like, the called terminal in establishing a dedicated bearer that meets a specific QoS policy with the mobile communication network that is accessed by the called terminal, so that the called terminal completes resource reservation for the session, thereby improving the success rate of establishing a session between the calling terminal and the called terminal.

In a possible implementation, when the second terminal fails to complete resource reservation for the session before the duration recorded by the second timer reaches the preset second duration, the second terminal may send a first session termination message to the first terminal, indicating that the session that is requested to be established by using the session request message is terminated. In this way, that the first terminal waits for a long time for the second terminal to perform resource reservation for the session is avoided, thereby improving user experience of the first terminal.

In a possible implementation, when the first terminal fails to complete resource reservation for the session before the duration recorded by the first timer reaches the preset first duration, the first terminal may send, to the second terminal, a session cancellation message used to request to terminate the session. The second terminal may send a second session termination message to the first terminal according to the session cancellation message, where the second session termination message is used to indicate that the session that is requested to be established by using the session request message is terminated.

In a possible implementation, after the first terminal receives the second session termination message, the first terminal may leave a mobile communication network that is accessed by the first terminal and access another mobile communication network that is allowed to be accessed by the first terminal, and send a second session request message to the second terminal through the another mobile communication network, where the second session request message is used to request to establish a session between the first terminal and the second terminal.

In other words, when the mobile communication network that is accessed by the first terminal cannot support the first terminal in completing resource reservation for the session in a relatively short time, the first terminal may switch to another mobile communication network that is allowed to be accessed by the first terminal, and requests, through the another mobile communication network, to re-establish a session between the first terminal and the second terminal, so that the first terminal and the second terminal can complete session establishment and perform a media service as soon as possible.

According to a second aspect, a first terminal is provided. For beneficial effects, refer to descriptions in the first aspect. The first terminal includes a memory and a processor. The memory is configured to store a computer program. The processor is configured to run the computer program stored in the memory, to perform the following steps: sending a first session request message to the second terminal, where the first session request message is used to request to establish a session between the first terminal and the second terminal; receiving a session response message from the second terminal; starting a first timer; when the first terminal completes resource reservation for the session before duration recorded by the first timer reaches preset first duration, sending a resource reservation completion acknowledgment message to the second terminal; and receiving a ringing message from the second terminal, where the ringing message is sent by the second terminal when the second terminal completes resource reservation for the session before duration recorded by the second timer reaches preset second duration, the second timer is started by the second terminal after the second terminal receives the session request message, and the first duration is shorter than the second duration.

In a possible implementation, the processor is further configured to receive a first session termination message from the second terminal, where the first session termination message is used to indicate that the session is terminated, and the first session termination message is sent by the second terminal when the second terminal fails to complete resource reservation for the session before duration recorded by the second timer reaches the preset second duration.

In a possible implementation, the processor is further configured to: when the first terminal fails to complete resource reservation for the session before duration recorded by the first timer reaches preset first duration, send a session cancellation message to the second terminal, where the session cancellation message is used to request to terminate the session; and receive a second session termination message from the second terminal, where the second session termination message is used to indicate that the session is terminated.

In a possible implementation, the processor is further configured to: leave a mobile communication network that is accessed by the first terminal and access another mobile communication network that is allowed to be accessed by the first terminal; and send a second session request message to the second terminal through the another mobile communication network, where the second session request message is used to request to establish a session between the first terminal and the second terminal.

According to a third aspect, a second terminal is provided. For beneficial effects, refer to descriptions in the first aspect. The second terminal includes a memory and a processor. The memory is configured to store a computer program. The processor is configured to run the computer program stored in the memory, to perform the following steps: receiving a first session request message from a first terminal, where the first session request message is used to request to establish a session between the first terminal and a second terminal; sending a session response message to the first terminal based on the first session request message; and starting a second timer; receiving a resource reservation completion acknowledgment message from the first terminal, where the resource reservation completion acknowledgment message is sent by the first terminal when the first terminal completes resource reservation for the session before duration recorded by a first timer reaches preset first duration, and the first timer is started by the first terminal after the first terminal receives the session response message; when the second terminal completes resource reservation for the session before duration recorded by the second timer reaches preset second duration, sending a ringing message to the first terminal, where the second duration is longer than the first duration.

In a possible implementation, the processor is further configured to: when the second terminal fails to complete resource reservation for the session before the duration recorded by the second timer reaches the preset second duration, send a first session termination message to the first terminal, where the first session termination message is used to indicate that the session is terminated.

In a possible implementation, the processor is further configured to: receive a session cancellation message from the second terminal, where the session cancellation message is used to request to terminate the session, and the session cancellation message is sent by the first terminal when the first terminal fails to complete resource reservation for the session before duration recorded by the first timer reaches preset first duration; and send a second session termination message to the first terminal based on the session cancellation message, where the second session termination message is used to indicate that the session is terminated.

In a possible implementation, the processor is further configured to receive a second session request message from the first terminal, where the second session request message is used to request to establish a session between the first terminal and the second terminal, and the second session request message is sent by the first terminal through another mobile communication network after the first terminal leaves a mobile communication network that is accessed by the first terminal and accesses the another mobile communication network that is allowed to be accessed by the first terminal.

According to a fourth aspect, a session establishment method is provided. The method is performed by a first terminal, and may be specifically a chip in the first terminal, a processor included therein, or a system thereon. For beneficial effects, refer to the descriptions in the first aspect. The method includes: sending a first session request message to a second terminal, where the first session request message is used to request to establish a session between the first terminal and the second terminal; receiving a session response message from the second terminal; starting a first timer; and when the first terminal completes resource reservation for the session before duration recorded by the first timer reaches preset first duration, sending a resource reservation completion acknowledgment message to the second terminal; and receive a ringing message from the second terminal, where the ringing message is sent by the second terminal when the second terminal completes resource reservation for the session before duration recorded by the second timer reaches preset second duration, the second timer is started by the second terminal after the second terminal receives the session request message, and the first duration is shorter than the second duration.

In a possible implementation, the method further includes: receiving a first session termination message from the second terminal, where the first session termination message is used to indicate that the session is terminated, and the first session termination message is sent by the second terminal when the second terminal fails to complete resource reservation for the session before the duration recorded by the second timer reaches the preset second duration.

In a possible implementation, the method further includes: when the first terminal fails to complete resource reservation for the session before the duration recorded by the first timer reaches the preset first duration, sending a session cancellation message to the second terminal, where the session cancellation message is used to request to terminate the session; and receiving a second session termination message from the second terminal, where the second session termination message is used to indicate that the session is terminated.

In a possible implementation, after the receiving a second session termination message from the second terminal, the method further includes: leaving a mobile communication network that is accessed by the first terminal and accessing another mobile communication network that is allowed to be accessed by the first terminal; and sending a second session request message to the second terminal through the another mobile communication network, where the second session request message is used to request to establish a session between the first terminal and the second terminal.

According to a fifth aspect, a session establishment method is provided. The method is performed by a second terminal, and may be specifically a chip in the second terminal, a processor included therein, or a system thereon. For beneficial effects, refer to the descriptions in the first aspect. The method includes: receiving a first session request message from a first terminal, where the first session request message is used to request to establish a session between the first terminal and a second terminal; sending a session response message to the first terminal based on the first session request message, and starting a second timer; receiving a resource reservation completion acknowledgment message from the first terminal, where the resource reservation completion acknowledgment message is sent by the first terminal when the first terminal completes resource reservation for the session before duration recorded by a first timer reaches preset first duration, and the first timer is started by the first terminal after the first terminal receives a session response message; and when the second terminal completes resource reservation for the session before duration recorded by the second timer reaches preset second duration, sending a ringing message to the first terminal, where the second duration is longer than the first duration.

In a possible implementation, the method further includes: when the second terminal fails to complete resource reservation for the session before the duration recorded by the second timer reaches the preset second duration, sending a first session termination message to the first terminal, where the first session termination message is used to indicate that the session is terminated.

In a possible implementation, the method further includes: receiving a session cancellation message from the second terminal, where the session cancellation message is used to request to terminate the session, and the session cancellation message is sent by the first terminal when the first terminal fails to complete resource reservation for the session before the duration recorded by the first timer reaches the first duration; and sending a second session termination message to the first terminal based on the session cancellation message, where the second session termination message is used to indicate that the session is terminated.

In a possible implementation, where after the sending a second session termination message to the first terminal based on the session cancellation message, the method further includes: receiving a second session request message from the first terminal, where the second session request message is used to request to establish a session between the first terminal and the second terminal, and the second session request message is sent by the first terminal through the another mobile communication network after the first terminal leaves a mobile communication network that is accessed by the first terminal and accesses another mobile communication network that is allowed to be accessed by the first terminal.

According to a sixth aspect, a chip is provided. The chip includes a processor, configured to implement a function of the first terminal according to any embodiment of the second aspect, and implement a function of the second terminal according to any embodiment of the third aspect.

According to a seventh aspect, a communication apparatus is provided, and the communication apparatus has functions of the first terminal and/or the second terminal in the foregoing aspects. The communication apparatus may be implemented by hardware, or may be implemented by hardware executing corresponding software. The hardware or the software includes one or more units corresponding to functions of the first terminal and/or the second terminal.

According to an eighth aspect, a computer-readable storage medium is provided, and is configured to store a computer program/instruction. When the computer program/instruction is executed by a processor of a terminal, the terminal implements the method according to any one of the fourth aspect and/or the fifth aspect.

According to a ninth aspect, a computer program product is provided. The computer program product includes a computer program/instructions. When the computer program/instructions is/are run by a terminal, the terminal performs the method according to any one of the fourth aspect or the fifth aspect.

BRIEF DESCRIPTION OF THE DRAWINGS

The following briefly describes the accompanying drawings that need to be used in the descriptions of embodiments or the conventional technology.

DETAILED DESCRIPTION OF ILLUSTRATIVE EMBODIMENTS

The following describes the technical solutions in embodiments of this application with reference to the accompanying drawings in embodiments of this application.

In embodiments of this application, the term "and/or" is merely used to describe an association relationship between associated objects and indicates that three relationships may exist. For example, "A and/or B" may indicate the following three cases: Only A exists, only B exists, and both A and B exist. The term "a plurality of" means two or more, and the term "several" means one or more, unless otherwise specified. The terms "include", "including", and "have", and their variants all mean "include but are not limited to", unless otherwise specifically emphasized in another manner. Terms "first" and "second" are used only for a purpose of description, and shall not be construed as indicating or implying relative importance or implying a quantity of indicated technical features. Therefore, a feature restricted by "first" or "second" may explicitly indicate or implicitly include one or more such features.

In embodiments of this application, the words such as "example" or "for example" are used to represent giving an example, an illustration, or a description, and are intended to present a related concept in a specific manner. Any embodiment or design scheme described as an "example" or "for example" should not be explained as being more preferable or having more advantages than another embodiment or design scheme.

In embodiments of this application, a terminal (terminal) may be represented as a mobile device (mobile device, MD), user equipment (user equipment, UE), a mobile station (mobile station, MS), or a mobile terminal (mobile terminal, MT). Specifically, the terminal may include a mobile phone, a television, a wearable device, a tablet computer, a personal digital assistant (personal digital assistant, PDA), a laptop computer (laptop), a mobile computer, an augmented reality (augmented reality, AR) device, a virtual reality (virtual reality, VR) device, an artificial intelligence (artificial intelligence, AI) device, and the like.

Figure 1:
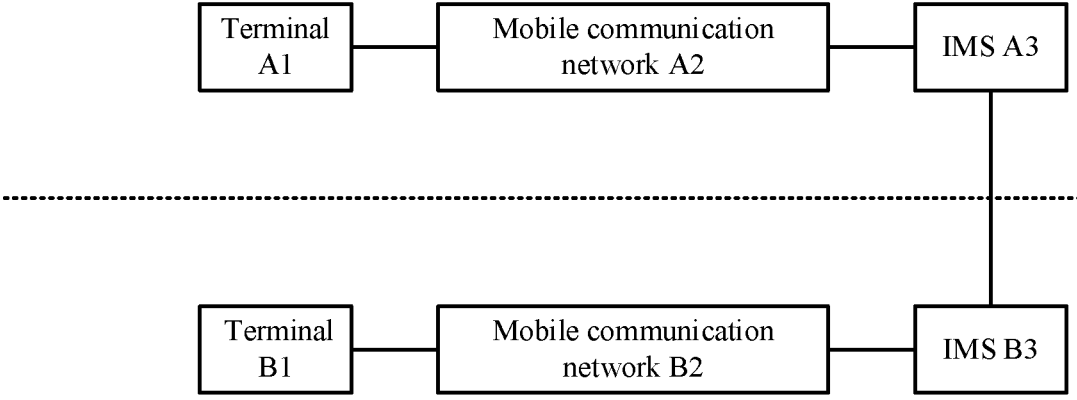
FIG. 1 is a schematic diagram of a communication system according to an embodiment of this application.

FIG. 1 is a schematic diagram of a communication system according to an embodiment of this application. As shown in FIG. 1, a terminal A1 is connected to an IMS A3 through a mobile communication network B1 that is accessed by the terminal A1, a terminal A2 is connected to an IMS B3 through a mobile communication network B2 that is accessed by the terminal A2, and the IMS A3 is communicatively connected to the IMS B3. The terminal A1 may be represented as a first terminal, and the terminal B1 may be represented as a second terminal. In addition, the IMS A3 and the IMS B3 may be a same IMS or different IMSs; the mobile communication network A2 and the mobile communication network B2 may be a same mobile communication network or different mobile communication networks; and both the terminal A1 and the terminal B1 are terminals that support resource reservation for a session.

The terminal A1 may serve as a calling terminal, and request to establish a session with the terminal B1 serving as a called terminal. The terminal A1 and the terminal B1 that successfully establish the session may perform a media service, for example, exchanging media data such as text, video, and voice. In a process of establishing the session, a dedicated bearer used to transmit media data needs to be established between the terminal A1 and the mobile communication network A2, and a dedicated bearer used to transmit media data needs to be established between the terminal device B1 and the mobile communication network B2. A process of establishing the dedicated bearer between the terminal and the mobile communication network may be referred to as resource reservation for the session. In addition, the dedicated bearer may include a media packet data protocol (packet data protocol, PDP) context, a packet data network (packet data network, PDN) connection, or a protocol data unit (protocol data unit, PDU) session, and needs to meet a specific QoS policy.

With reference to the communication system shown in FIG. 1, the following describes an example of a process of establishing the session between the terminal A1 and the terminal B1.

Figure 2A:
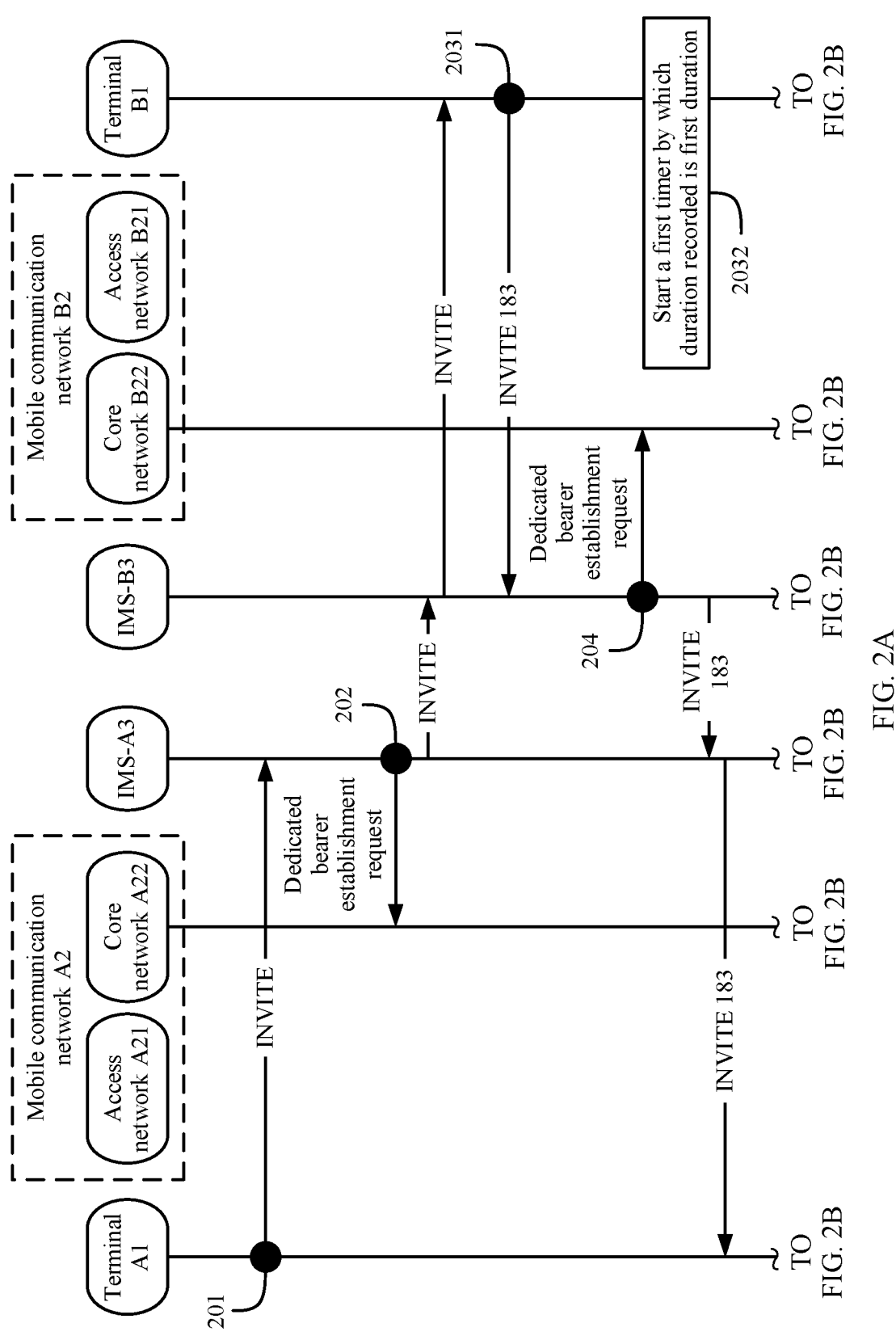
FIG. 2A and FIG. 2B are a flowchart 1 of a session establishment method according to an embodiment of this application.
Figure 2B:
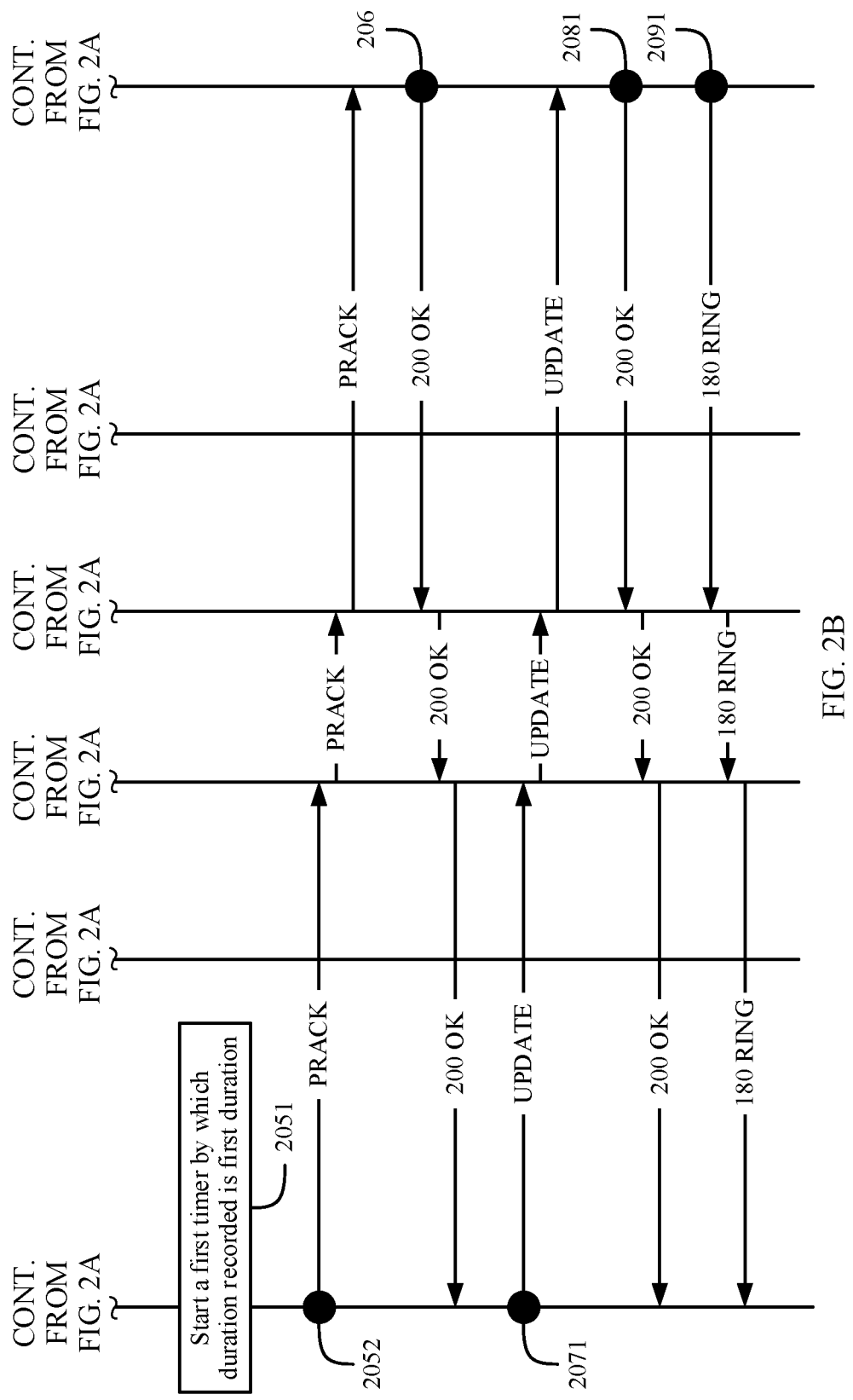

In some embodiments, the process of establishing the session between the terminal A1 and the terminal B1 may include but not be limited to some or all steps shown in FIG. 2A and FIG. 2B.

First, when a user holding the terminal A1 expects to perform a media service with the terminal B1, the user may trigger, by using an application deployed in the terminal A1, the terminal A1 to perform step 201 to send a session request message to the terminal B1.

The session request message is used to request to establish a session between the terminal A1 and the terminal B1, and may include an INVITE message. The INVITE message may include an identifier of the terminal A1, an identifier of the terminal B1, and an extension identifier, where the extension identifier is used to indicate that the terminal A1 supports resource reservation for the session. In addition, the INVITE message may further include media types supported by the terminal A1, such as video, audio (Audio), and text; and encoding and decoding modes supported by the terminal A1 with respect to various media types, such as PCMU, G.726, and G.729 supported by the terminal A1 with respect to the media type "audio".

The INVITE message may be transmitted to the IMS A3 through the mobile communication network A2. The IMS A3 may find, based on the identifier of the terminal B1, the IMS B3 connected to the terminal B1, and send the INVITE message to the IMS B3. The IMS B3 may send the INVITE message to the terminal B1 through the mobile communication network B2 that is accessed by the terminal B1.

After the INVITE message arrives at the IMS A3, the IMS A3 may perform step 202, to send a first dedicated bearer establishment request to the mobile communication network A2.

The first dedicated bearer establishment request is used to trigger the mobile communication network A2 to establish a dedicated bearer that meets a specific QoS policy with the terminal A1, so as to use the dedicated bearer to transmit media data exchanged between the terminal A1 and the terminal B1 in a subsequent process.

The mobile communication network A2 may include an access network A21 and a core network A22, and the mobile communication network B2 may include an access network B21 and a core network B22. The terminal A1 may access the mobile communication network A2 through the access network A21, and the core network A22 is connected to the IMS A3; and the terminal B1 may access the mobile communication network B2 through the access network B21, and the core network B22 is connected to the IMS B3.

The mobile communication network A2 and the mobile communication network B2 may include but not be limited to a 3G network, a 4G network, or a 5G network. Specifically, the access network A21 and the access network B21 may include a universal mobile telecommunications system terrestrial radio access network (universal mobile telecommunications system terrestrial radio access network, UTRAN), an evolved universal mobile telecommunications system terrestrial radio access network (evolved universal mobile telecommunications system terrestrial radio access network, EUTRAN), or a new radio (new radio, NR) system. The core network A22 and the core network B22 may include a 3G core network, an evolved packet core network (evolved packet core network, EPC), or a 5G core network (5GC). A gateway general packet radio service (general packet radio service, GPRS) support node (gateway GPRS support node, GGSN) of the 3G core network may be in communication connection with the IMS. The PDN gateway (PDN gateway, PGW) of the EPC may be communicatively connected to the IMS. A user plane function (user plane function, UPF) entity of the 5G core network may be in communication connection with the IMS.

Figure 3:
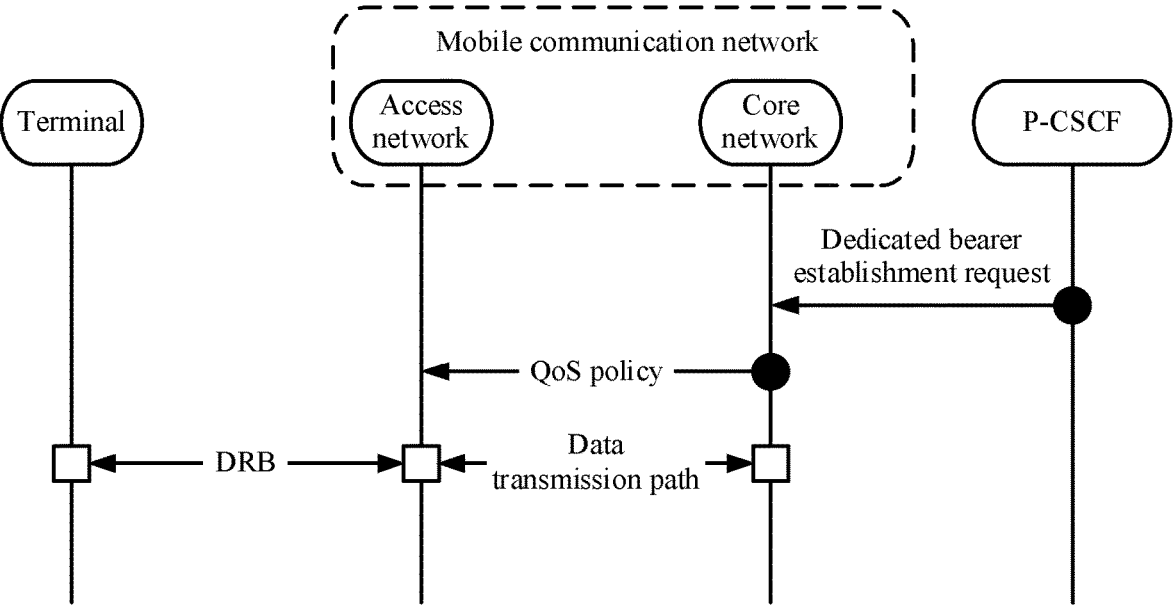
FIG. 3 is a schematic diagram of establishing a dedicated bearer between a terminal and a mobile communication network according to an embodiment of this application.

The dedicated bearer between the terminal A1 and the mobile communication network A2 may include a data transmission path between the access network A21 and the core network A22, and a data radio bearer (data radio bearer, DRB) between the terminal A1 and the access network A21. For example, refer to FIG. 3. The core network, in response to a dedicated bearer establishment request from a proxy-call session control function (proxy-call session control function, P-CSCF) entity in an IMS, generates a corresponding QoS policy based on QoS configuration information from an application layer. Then, the core network may send the QoS policy to the access network. Based on the QoS policy, the access network may establish, with the core network, a data transmission path used to transmit media data, for example, establish, with a GGSN, a PGW, or a UPF entity in the core network, a data transmission path used to transmit media data. The access network may further send the QoS policy to the terminal, so that radio resource control (radio resource control, RRC) signaling or other signaling is exchanged between the terminal and the access network, to establish a DRB that meets the QoS policy between the terminal and the access network, so as to establish a dedicated bearer between the terminal and the mobile communication network, that is, resources are reserved for the session.

The terminal B1 that receives the INVITE message may learn, based on the extension identifier included in the INVITE message, that the terminal A1 supports resource reservation for the session. In the case that the terminal B1 supports resource reservation, the terminal B1 may, based on an indication of the extension identifier included in the INVITE message, perform step 2031 to send a session response message to the terminal A1; and perform step 2032 to start a first timer by which duration recorded is the preset first duration.

The session response message may include an INVITE 183 message. The INVITE 183 message, as a temporary response to a session request, may include first indication information and second indication information. The first indication information is used to indicate the terminal A1 to perform resource reservation for the session, and the second indication information is used to indicate the terminal A1 to return a corresponding resource reservation completion acknowledgment message to the terminal B1 after the terminal A1 completes resource reservation for the session. In addition, the INVITE 183 message may further include media types supported by the terminal B1 and encoding and decoding modes supported by the terminal B1 with respect to various media types.

The INVITE 183 message may be transmitted to the IMS B3 through the mobile communication network B2; the IMS B3 sends the INVITE 183 message to the IMS A3; and the IMS A3 may send the INVITE message to the terminal A1 through the mobile communication network A2 that is accessed by the terminal A1.

After the INVITE 183 message arrives at the IMS B3, the IMS B3 may perform step 204 to send a second dedicated bearer establishment request to the mobile communication network B2.

The second dedicated bearer establishment request is used to trigger the mobile communication network B2 to establish a dedicated bearer that meets a specific QoS policy with the terminal B1, so as to use the dedicated bearer to transmit media data exchanged between the terminal A1 and the terminal B1 in a subsequent process. A process in which the mobile communication network B2 and the terminal B1 establish the dedicated bearer that meets the specific QoS policy is similar to the foregoing process in which the mobile communication network A2 and the terminal A1 establish the dedicated bearer that meets the specific QoS policy, and therefore details are not described herein again.

The terminal A1 that receives the INVITE 183 message may perform step 2051 to start a timer by which duration recorded is the preset first duration; and perform step 2052 to send a temporary response acknowledgment message to the terminal B1.

The temporary response acknowledgment message may include a PRACK message. The PRACK message may include one or more target media types determined by the terminal A1 and target encoding and decoding modes respectively corresponding to various target media types. If the terminal A1 and the terminal B1 successfully establish a session, the terminal A1 and the terminal B1 may exchange media data of various target media types in a subsequent process, and encode or decode the corresponding media data by using the target encoding and decoding modes corresponding to the various target media types.

For example, the terminal A1 may learn, based on the INVITE 183 message, of various media types supported by the terminal B1 and encoding and decoding modes supported by the terminal B1 relative to the various media types. For example, the media types supported by both the terminal A1 and the terminal B1 include video and audio. The terminal A1 may separately determine the media types "audio" and "video" supported by both the terminal A1 and the terminal B1 as the target media types. For example, the encoding and decoding modes supported by both the terminal A1 and the terminal B1 relative to the media type "audio" include PCMU and G.726. For the target media type "audio" determined by the terminal A1, the terminal A1 may determine one encoding and decoding mode of the PCMU and G.726 as the target encoding and decoding mode corresponding to the target media type "audio".

The terminal A1 may learn, based on the first indication information included in the INVITE 183 message, that the terminal A1 needs to perform resource reservation for the session between the terminal A1 and the terminal A2; and learn, based on the second indication information included in the INVITE 183 message, that the terminal A1 needs to, after completing resource reservation for the session, send a resource reservation completion acknowledgment message to the terminal B1.

Similar to the process of transmitting the INVITE message, the PRACK message may be transmitted to the IMS A3 through the mobile communication network A1; then, the IMS A3 sends the PRACK message to the IMS B3; and the IMS B3 sends the PRACK message to the terminal B1 through the mobile communication network B2 that is accessed by the terminal B2.

The terminal B1 that receives the PRACK message may perform step 206 to send a first acknowledgment message to the terminal A1.

The first acknowledgment message may include a PRACK 200 OK message that is used to indicate that the PRACK message from the terminal A1 is successfully received by the terminal B1.

For the terminal A1, if the terminal A1 completes resource reservation for the session before duration recorded by the first timer that is started by the terminal A1 reaches preset first duration, that is, the terminal A1 completes establishment of a dedicated bearer that meets a specific QoS policy before the duration recorded by the first timer that is started by the terminal A1 reaches the preset first duration, the terminal A1 may perform step 2071, to send a resource reservation completion acknowledgment message to the terminal B1.

The resource reservation completion acknowledgment message may include an UPDATE message, where the UPDATE message is used to indicate that the terminal A1 has completed resource reservation for the session.

The terminal B1 may, in response to the resource reservation completion acknowledgment message from the terminal A1, perform step 2081, to send a second acknowledgment message to the terminal A1.

The second acknowledgment message may include an UPDATE 200 OK message, where the UPDATE 200 OK message is used to indicate that the UPDATE message is successfully received by the terminal B1.

After the terminal B1 successfully receives the UPDATE message from the terminal A1, if the terminal B1 completes resource reservation for the session before duration recorded by the first timer that is started by the terminal B1 reaches preset first duration, that is, the terminal B1 completes establishment of a dedicated bearer that meets a specific QoS policy before duration recorded by the timer reaches the preset first duration, the terminal B1 may perform step 2091 to send a ringing message to the terminal B1.

The ringing message may include a 180 RING message.

It should be noted that, when the terminal B1 completes resource reservation for the session before the duration recorded by the first timer that is started by the terminal B1 reaches the preset first duration, the terminal B1 may start ringing to prompt a user holding the terminal B1 to go off-hook and answer.

It should be noted that, after the terminal B1 successfully sends the ringing message, if the user holding the terminal B1 goes off-hook and answers, the terminal B1 may send a session acknowledgment message to the terminal A1, so as to complete establishment of the session between the terminal A1 and the terminal B1, and then perform a media service based on the session established between the terminal A1 and the terminal B1. The session acknowledgment message may include an INVITE 200 OK message.

When a fault occurs in the mobile communication network A2, a packet loss occurs, computing resources are insufficient, or network resources are insufficient, the mobile communication network A2 may fail to complete establishment of a dedicated bearer between the mobile communication network A2 and the terminal A1 in a relatively short time. As a result, the terminal A1 cannot complete resource reservation for the session in a relatively short time period. In order to improve user experience and enable the terminal A1 and the terminal B1 to start a media service as quickly as possible, in some embodiments, a difference from the embodiment shown in FIG. 2A and FIG. 2B lies in that when the duration recorded by the first timer that is started by the terminal A1 reaches the preset first duration, if the terminal A1 still fails to complete establishment of a dedicated bearer between the terminal A1 and the mobile communication network A2, that is, the terminal A1 fails to complete resource reservation for the session, the terminal A1 leaves the mobile communication network A2, re-accesses another mobile communication network that is allowed to be accessed by the terminal A1, and re-requests to establish a session with the terminal B1 through the another mobile communication network.

Figure 4A:
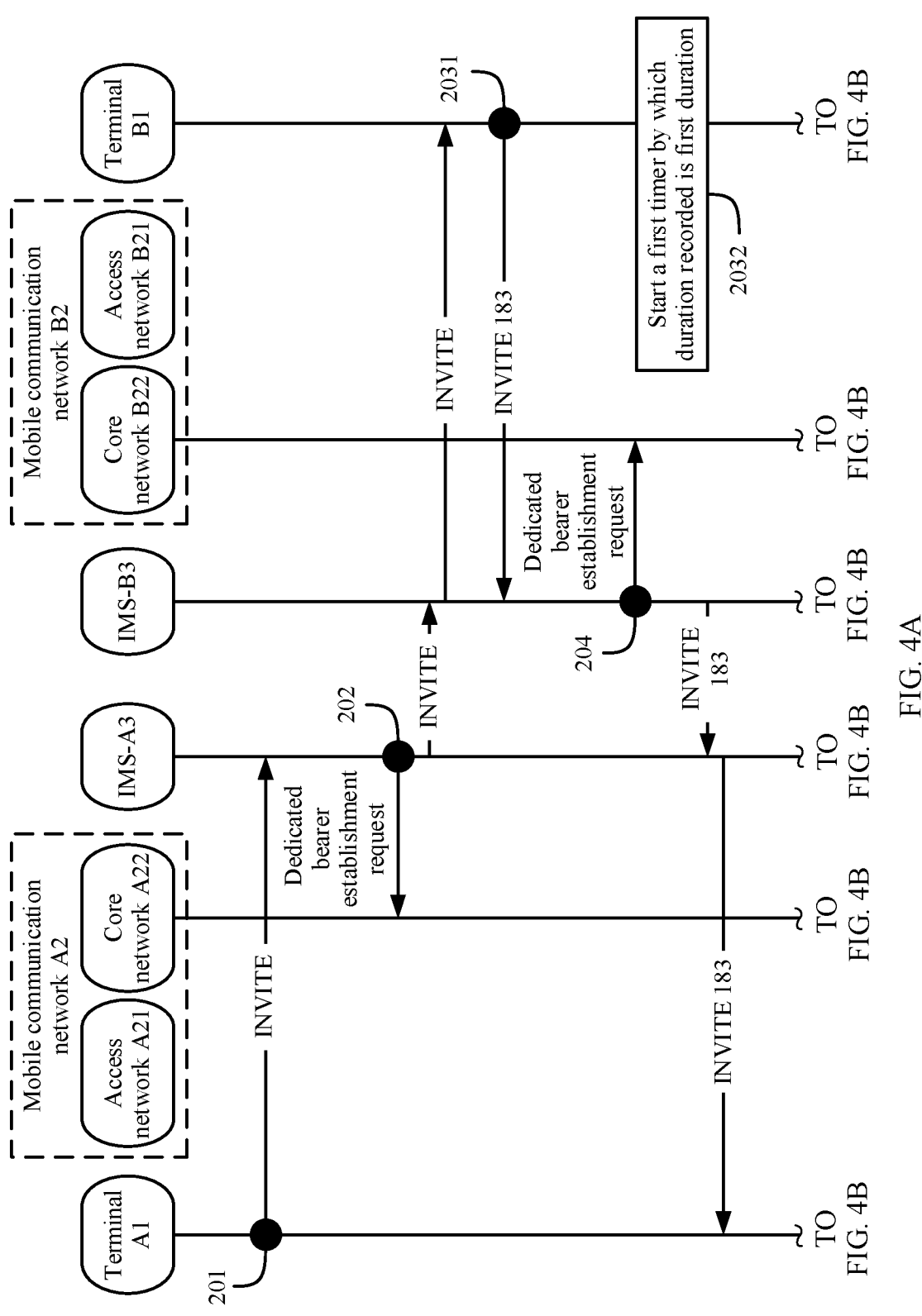
FIG. 4A and FIG. 4B are a flowchart 2 of a session establishment method according to an embodiment of this application.
Figure 4B:
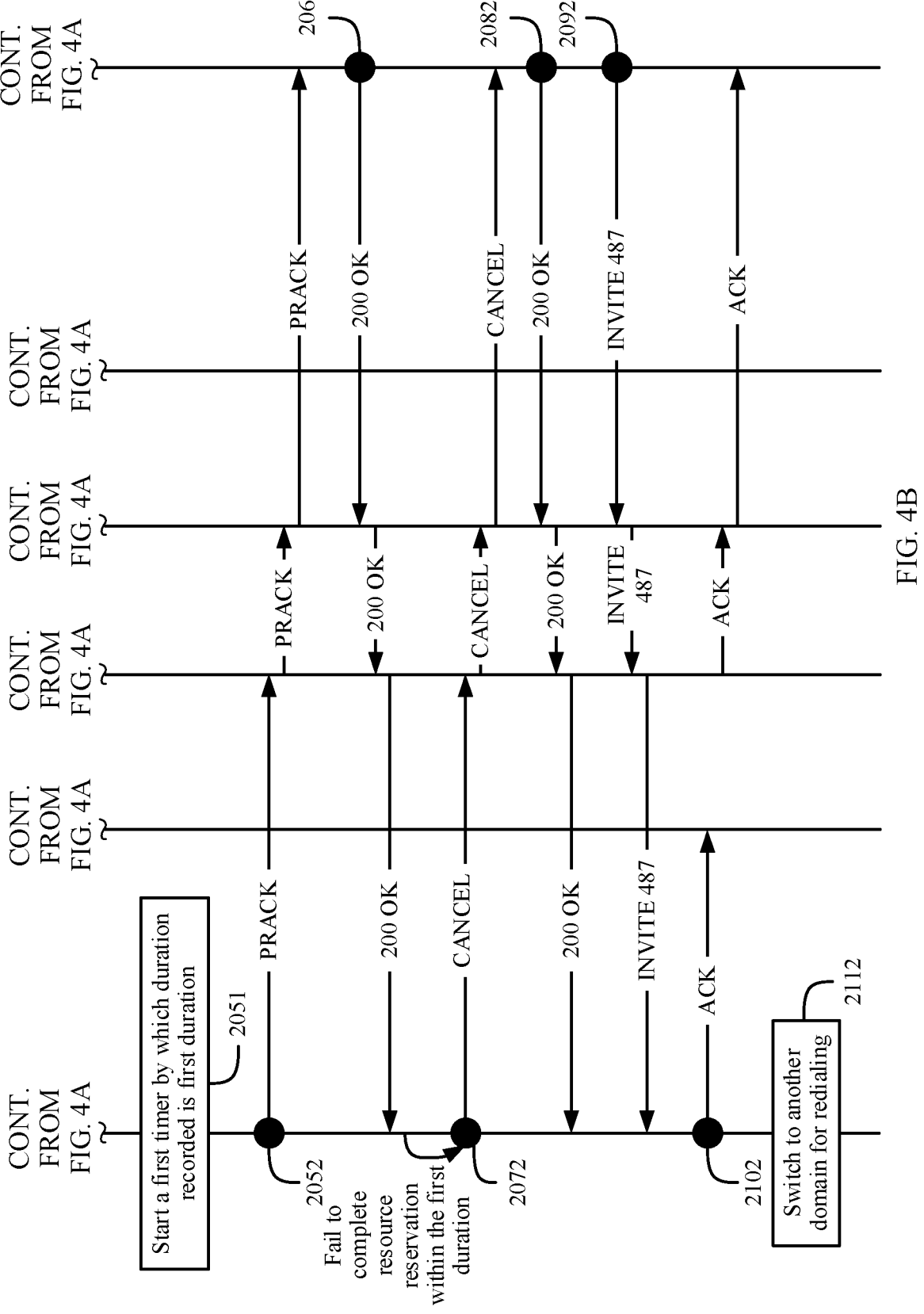

Refer to FIG. 4A and FIG. 4B. In a more specific example, if the terminal A1 fails to complete establishment of a dedicated bearer that meets a specific QoS policy before duration recorded by the first timer that is started by the terminal A1 reaches preset first duration, that is, the terminal A1 fails to complete resource reservation for the session within the first duration, the terminal A1 may perform step 2072 to send a session cancellation message to the terminal B1.

The session cancellation message may include a CANCEL message, where the CANCEL message is used to indicate to cancel establishment of a session that is requested to be established by using the INVITE message, or is used to indicate the terminal B1 to terminate execution of a related processing procedure for the INVITE message, for example, terminate execution of establishing a dedicated bearer between the terminal B1 and the mobile communication network B2.

After receiving the CANCEL message from the terminal A1, the terminal B1 first performs step 2082, to send a third acknowledgment message to the terminal A1; then performs step 2092, to send a second session termination message to the terminal A1.

The third acknowledgment message may include a CANCEL 200 OK message used to indicate that the terminal B1 has successfully received the CANCEL message from the terminal A1. The second session termination message may include an INVITE 487 message used to indicate that the session that is requested to be established by using the INVITE message is terminated.

After receiving the INVITE 487 message from the terminal B1, the terminal A1 may perform step 2102, to send a fourth acknowledgment message to terminal B1; then perform step 2112, to switch to another domain for redialing.

The fourth acknowledgment message may include an ACK message that is relative to the INVITE message and that is used to indicate that the terminal A1 successfully learns that the session that is requested to be established by using the INVITE message is terminated.

That the terminal A1 switches to another domain for redialing means that the terminal A1 leaves the mobile communication network A1, accesses another mobile communication network that is allowed to be accessed by the terminal A1, and re-requests, through the another mobile communication network, to establish a session with the terminal B1. For example, the mobile communication network A2 includes a 4G network, and the mobile communication network that may be allowed to be accessed by the terminal A1 further includes a 3G network. In this case, the terminal A1 may leave the 4G network and access the 3G network, and send a session request message to the terminal B1 through a circuit switched (Circuit Switched, CS) domain of the 3G network, to request to establish a session between the terminal A1 and the terminal B1.

When a fault occurs in the mobile communication network B2, a packet loss occurs, a computing resource is insufficient, or a network resource is insufficient, the mobile communication network B2 may fail to complete establishment of a dedicated bearer between the mobile communication network B2 and the terminal B1 in a relatively short time. As a result, the terminal B1 cannot complete resource reservation for the session in a relatively short time period.

To prevent the terminal A1 from waiting for the terminal B1 to perform resource reservation for the session for a long time, in some embodiments, a difference from the embodiment shown in FIG. 2A and FIG. 2B lies in that when the duration recorded by the first timer that is started by the terminal B1 reaches the preset first duration, if the terminal B1 still fails to complete establishment of a dedicated bearer between the terminal B1 and the mobile communication network B2, that is, the terminal B1 fails to complete resource reservation for the session, the terminal B1 terminates the session that is requested to be established by using the INVITE message.

Figure 5A:
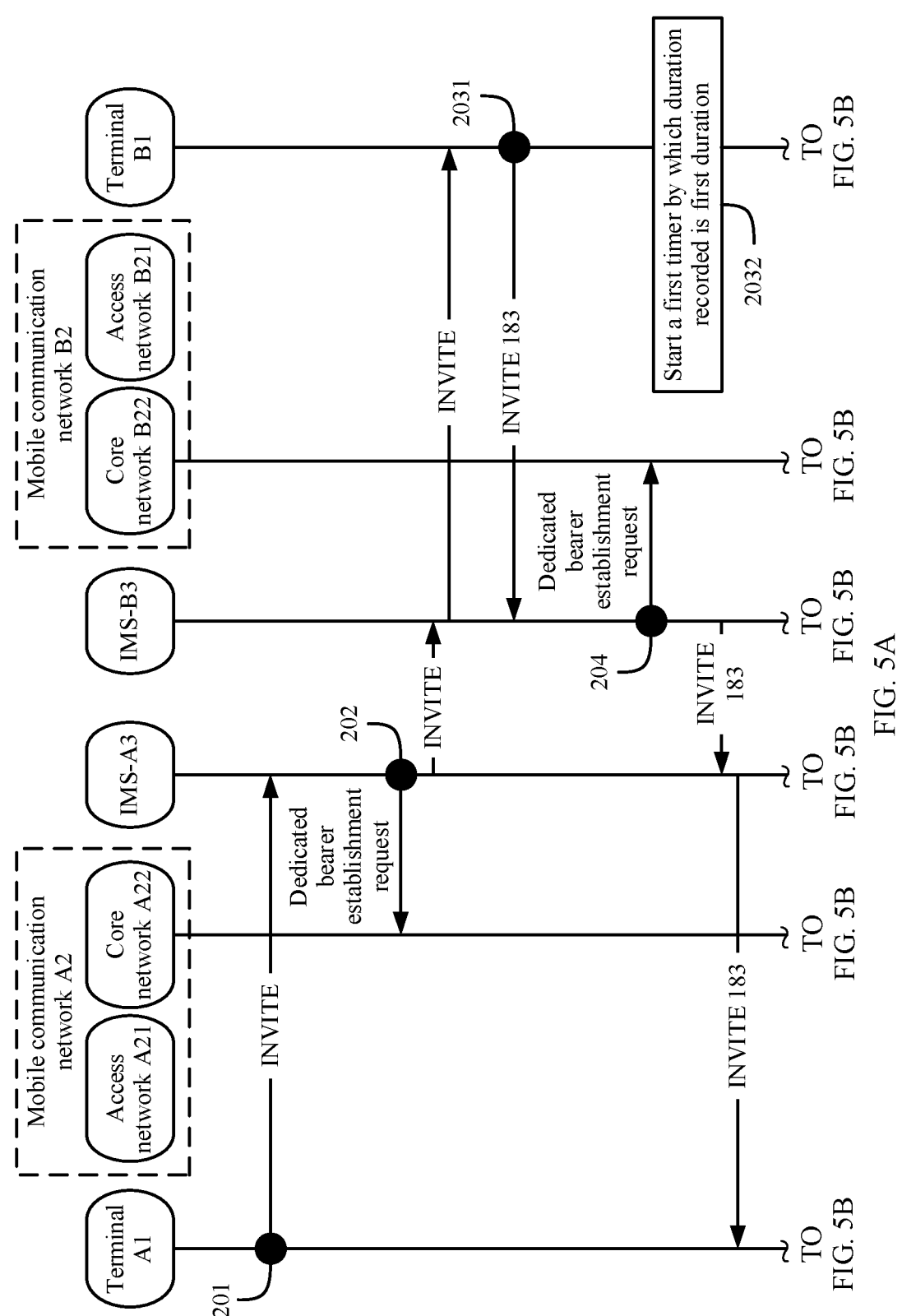
FIG. 5A and FIG. 5B are a flowchart 3 of a session establishment method according to an embodiment of this application.
Figure 5B:
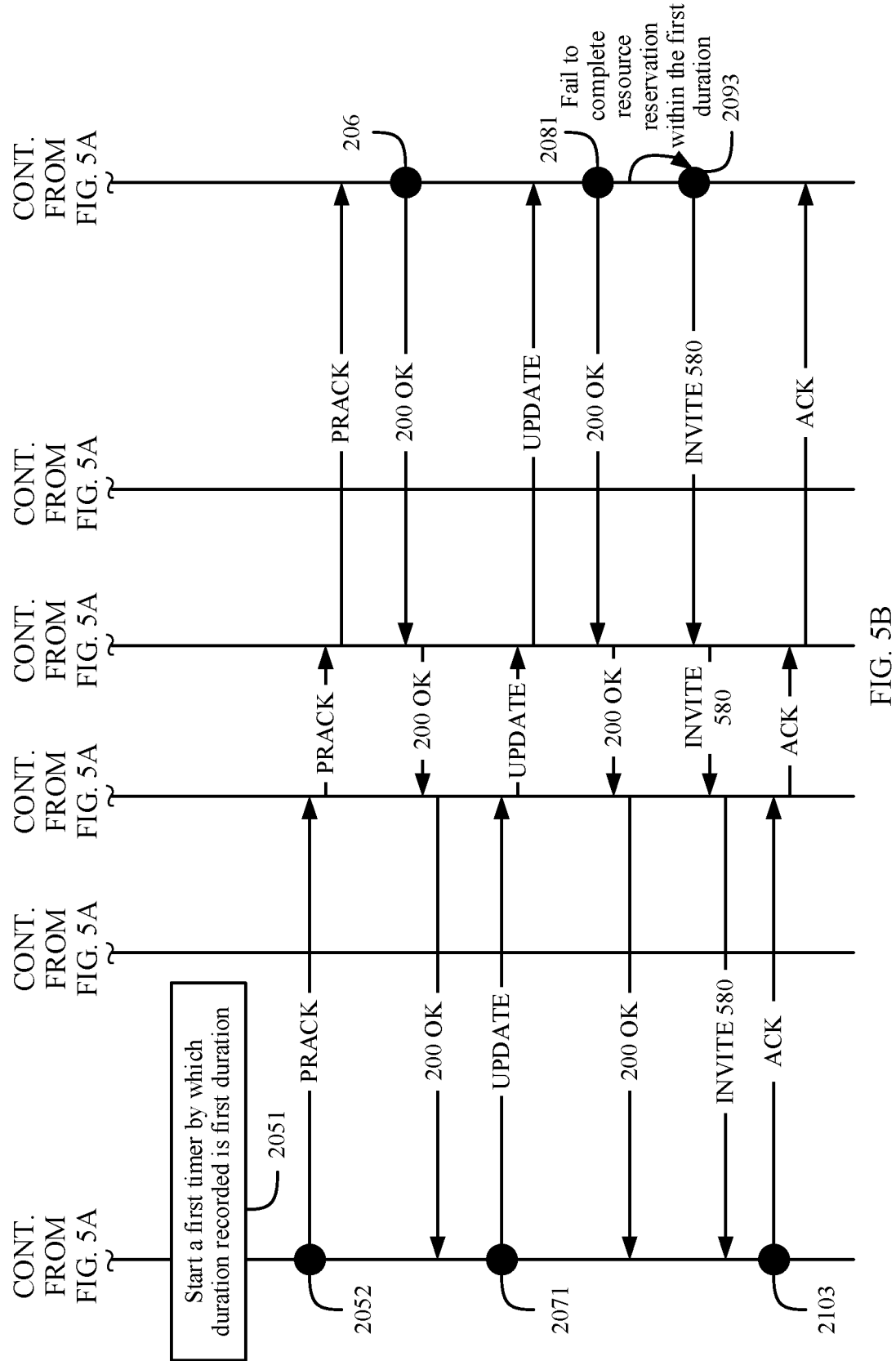

Refer to FIG. 5A and FIG. 5B. In a more specific example, after the terminal B1 successfully receives the UPDATE message from the terminal A1 and sends the UPDATE 200 OK to the terminal A1, if the terminal B1 fails to complete establishment of a dedicated bearer that meets a specific QoS policy before duration recorded by the first timer that is started by the terminal B1 reaches preset first duration, that is, the terminal B1 fails to complete resource reservation for the session within the first duration, the terminal B1 may perform step 2093 to send a first session termination message to the terminal A1.

The first session termination message may include an INVITE 580 message, where the INVITE 580 message is used to indicate the terminal B1 to terminate the session because the resource reservation for the session is not completed.

After receiving the INVITE 580 message from the terminal B1, the terminal A1 may perform step 2103 to send a fifth acknowledgment message to the terminal B1.

The fifth acknowledgment message may include an ACK message that is relative to the INVITE message and that is used to indicate that the terminal A1 successfully learns that the session that is requested to be established by using the INVITE message is terminated.

In the foregoing embodiments, for the terminal A1, when the terminal A1 fails to complete resource reservation for the session before the duration recorded by the first timer that is started by the terminal A1 reaches the preset first duration, the terminal A1 may switch to another mobile communication network that is allowed to be accessed by the terminal A1, and re-request, through the mobile communication network obtained after the switching, to establish a session with the terminal B1. There is no negative impact on a success rate of establishing a session between the terminal A1 and the terminal B1. For the terminal B1, when the terminal B1 fails to complete resource reservation for the session before the duration recorded by the first timer that is started by the terminal B1 reaches the preset first duration, the terminal B1 directly terminates establishment of a session between the terminal A1 and the terminal B1. This reduces the success rate of establishing a session between the terminal A1 and the terminal B1.

Figure 6A:
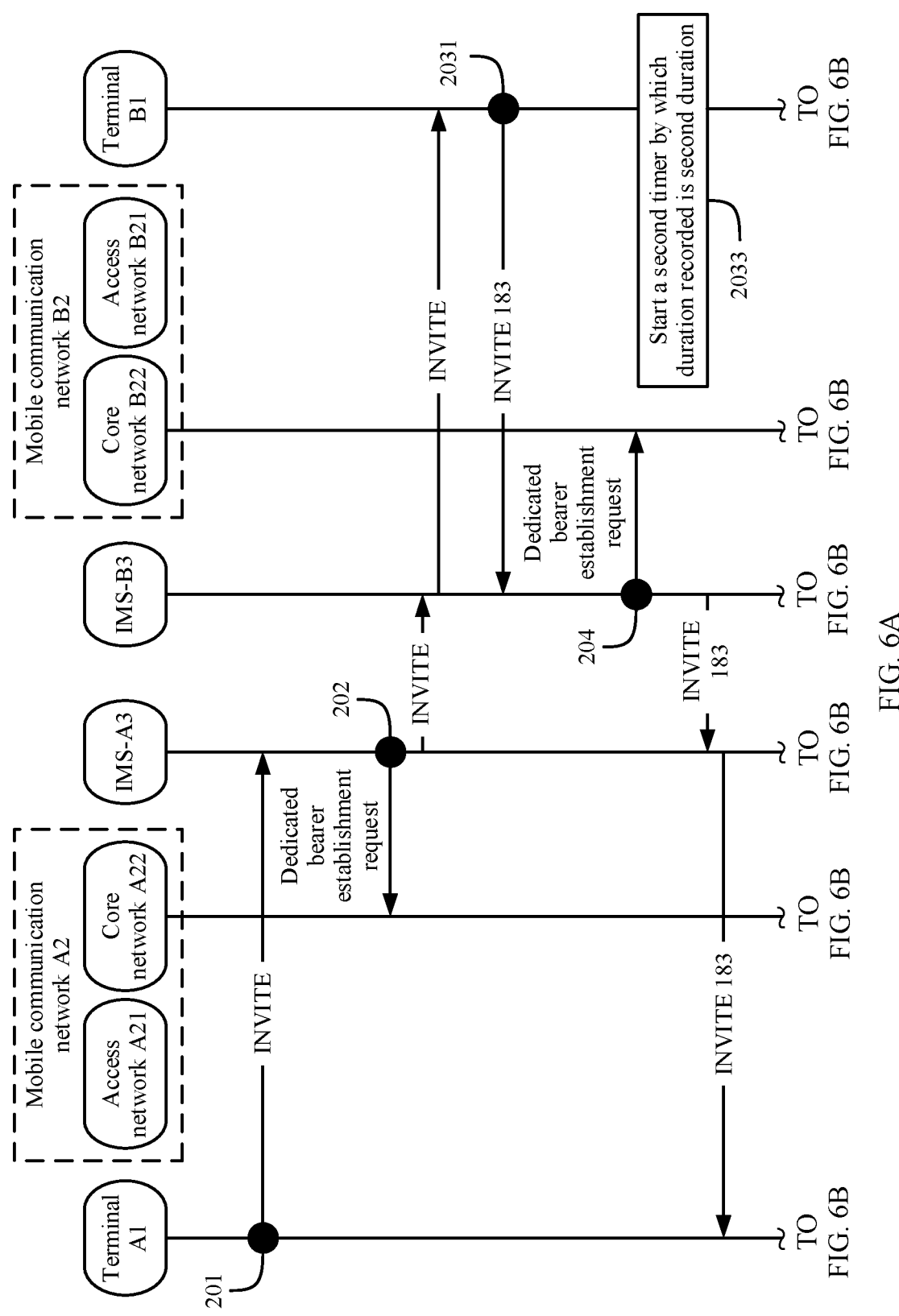
FIG. 6A and FIG. 6B are a flowchart 4 of a session establishment method according to an embodiment of this application.
Figure 6B:
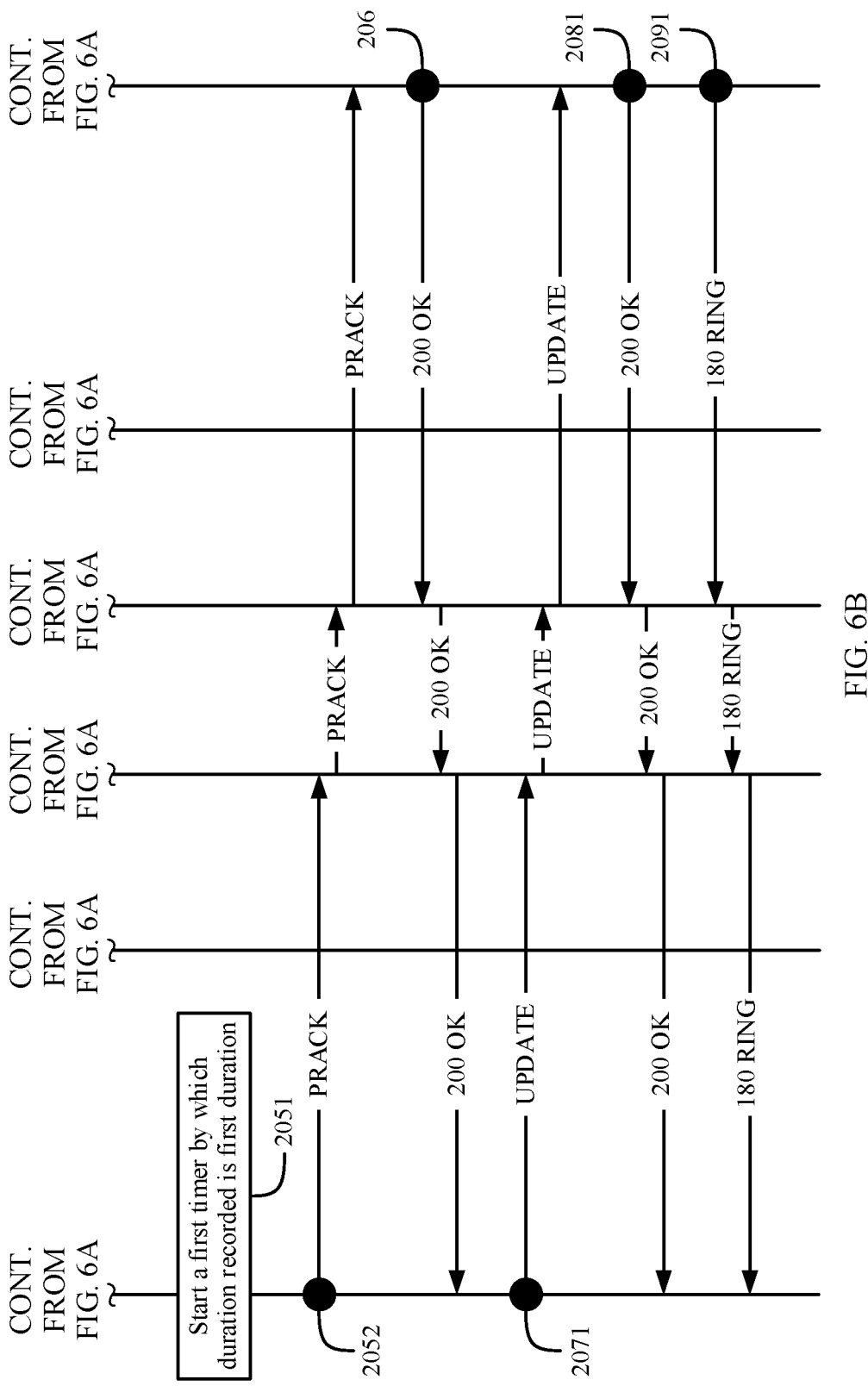

To improve the success rate of establishing a session between the terminal A1 and the terminal B1, in some embodiments, a difference from the embodiment shown in FIG. 2A and FIG. 2B lies in that, as shown in FIG. 6A and FIG. 6B, after sending an INVITE 183 message to the terminal A1, the terminal B1 does not perform step 2032, but performs step 2033, to start a second timer by which duration recorded reaches is preset second duration, where the second duration is longer than the first duration. In addition, if the terminal B1 completes resource reservation for the session before the duration recorded by the second timer reaches the second duration, the terminal B1 performs step 2091. If the terminal B1 fails to complete resource reservation for the session before the duration recorded by the second timer reaches the second duration, the terminal B1 performs step 2093.

In this way, compared with the calling terminal, the called terminal may have a longer time to complete resource reservation for the session without affecting user experience of the calling terminal. A mobile communication network that is accessed by the called terminal may support, in a longer time by releasing more available computing resources and network resources, retransmitting a lost data packet, and the like, the called terminal in establishing a dedicated bearer that meets a specific QoS policy with the mobile communication network that is accessed by the called terminal, thereby improving the success rate of establishing a session between the calling terminal and the called terminal.

Figure 7:
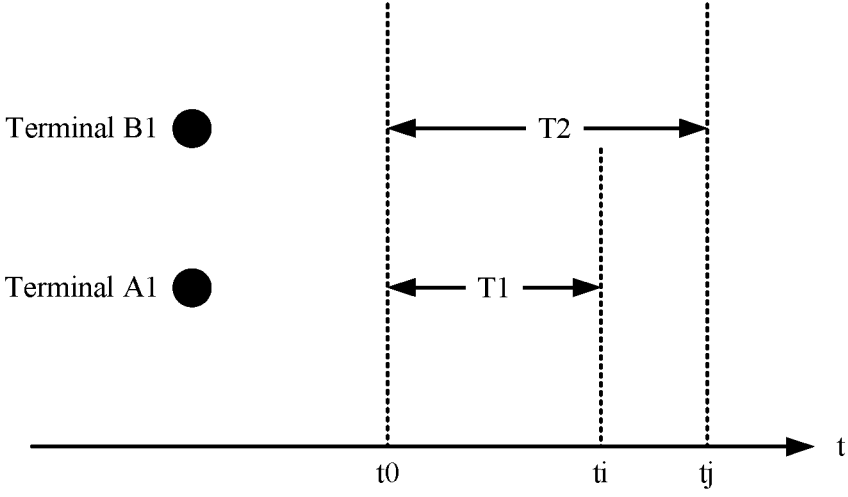
FIG. 7 is a schematic diagram of a time relationship in which a calling terminal and a called terminal perform resource reservation for a session according to an embodiment of this application.

For example, refer to FIG. 7. A time required for transmitting an INVITE 183 message from the terminal B1 to the terminal A1 is relatively short, and it is approximately considered that both a moment at which the terminal B1 starts the second timer and a moment at which the terminal A1 starts the first timer is a moment to. In the first duration between the moment to and the moment ti, the terminal B1 may fail to complete resource reservation for the session in the first duration between the moment to and the moment ti because in the mobile communication network B2 that is accessed by the terminal B1, available computing resources are insufficient, network resources are insufficient, a packet loss occurs, and the like. However, because first duration T1 is less than second duration T2, in a period between the moment ti and the moment tj, the mobile communication network B2 may continue to release occupied computing resources and network resources, retransmit a lost data packet, and the like, so that the terminal B1 completes resource reservation for the session in the period between the moment ti and the moment tj. In this way, a possibility that the terminal B1 completes resource reservation for the session is increased, a possibility that the session is terminated by the terminal B1 is reduced, and the success rate of establishing a session between the calling terminal and the called terminal is increased.

Based on a same concept as the foregoing method embodiments, an embodiment of this application further provides a terminal 80. The terminal 80 may serve as a calling terminal, and is configured to implement the method steps performed by the terminal A1 in the foregoing method embodiments. The terminal 80 may alternatively serve as a called terminal, and is configured to implement the method steps performed by the terminal B1 in the foregoing method embodiments. In other words, for a specific work process of the terminal 80, refer to a corresponding process in the foregoing method embodiments. Details are not described herein again. In addition, for ease of describing the technical solutions provided in this application, a terminal 80 served as a calling terminal is represented as a first terminal, and a terminal 80 served as a called terminal is represented as a second terminal.

Figure 8:
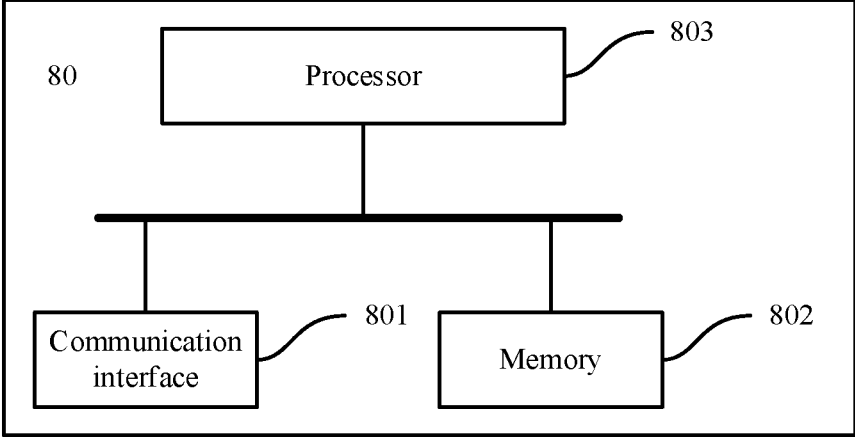
FIG. 8 is a schematic diagram of a structure of a terminal according to an embodiment of this application.

In some embodiments, as shown in FIG. 8, the terminal 80 may include a communication interface 801, a memory 802, and a processor 803. The communication interface 801 is configured to communicate with another terminal. The memory 802 is configured to store a computer program/instructions. The processor 803 is configured to run the computer program/instructions stored in the memory 802, to implement the method steps performed by the terminal A1 and/or the terminal B1 in the foregoing method embodiments.

If the terminal 80 is a first terminal, when the processor 803 runs the computer program/instructions stored in the memory 802, the processor 803 is configured to implement method steps performed by the terminal A1 in the foregoing method embodiments. Specifically, the processor 803 is configured to perform at least: sending a first session request message to a second terminal, where the first session request message is used to request to establish a session between the first terminal and the second terminal; receiving a session response message from the second terminal; starting a first timer; when the first terminal completes resource reservation for the session before duration recorded by the first timer reaches preset first duration, sending a resource reservation completion acknowledgment message to the second terminal; and receiving a ringing message from the second terminal, where the ringing message is sent by the second terminal when the second terminal completes resource reservation for the session before duration recorded by a second timer reaches preset second duration, the second timer is started by the second terminal after the second terminal receives the session request message, and the first duration is shorter than the second duration.

If the terminal 80 is a second terminal, when the processor 803 runs the computer program/instructions stored in the memory 802, the processor 803 is configured to implement method steps performed by the terminal B1 in the foregoing method embodiments. Specifically, the processor 803 is configured to perform at least: receiving a first session request message from a first terminal, where the first session request message is used to request to establish a session between the first terminal and the second terminal; sending a session response message to the first terminal based on the first session request message; starting a second timer; and receiving a resource reservation completion acknowledgment message from the first terminal, where the resource reservation completion acknowledgment message is sent by the first terminal when the first terminal completes resource reservation the session before duration recorded by the first timer reaches preset first duration, and the first timer is started by the first terminal after the first terminal receives the session response message; and when the second terminal completes resource reservation for the session before duration recorded by the second timer reaches preset second duration, sending a ringing message to the first terminal, where the second duration is longer than the first duration.

The terminal 80 may include a first communication apparatus configured to implement method steps performed by the terminal A1, and a second communication apparatus configured to implement method steps performed by the terminal B1. The first communication apparatus and the second communication apparatus may be independently deployed in the terminal 80, or may be integrated into one communication apparatus and deployed in the terminal 80. The communication apparatus may be implemented by hardware, or may be implemented by hardware executing corresponding software. The hardware or the software may include one or more units corresponding to method steps separately performed by the terminal A1 and the terminal B1.

In some embodiments, when the communication apparatus is implemented by hardware executing software, the software may be a computer program product including a computer program/instructions. When the computer program/instructions is/are run by the processor 803 of the terminal 80, the terminal 80 or the processor 803 of the terminal 80 implements the method steps performed by the terminal A1 and/or the terminal B1 in the foregoing method embodiments.

An embodiment of this application further provides a computer-readable storage medium, configured to store a computer program/instructions. When the computer program/instructions is/are run by the processor of the terminal 80, the terminal 80 or the processor 803 of the terminal 80 implements the method steps performed by the terminal A1 and/or the terminal B1 in the foregoing method embodiments.

An embodiment of this application further provides a chip/system on chip. The chip/system on chip is configured to implement the method steps performed by the terminal A1 and/or the terminal B1 in the foregoing method embodiments. The chip/system on chip is deployed in the terminal 80.

In summary, for a single terminal 80, the terminal 80 may be configured with a first timer and a second timer, and preset first duration and second duration, where the first timer and the second timer may be timers independent of each other, or may be a same timer. In this way, when the terminal 80 serves as a calling terminal, the terminal 80 may communicate with a corresponding called terminal based on the first timer and the first duration that are configured for the terminal 80, to implement the technical solutions provided in embodiments of this application. When the terminal 80 serves as a called terminal, the terminal 80 may communicate with a corresponding calling terminal based on the second timer and the second duration that are configured for the terminal 80, to implement the technical solutions provided in embodiments of this application.

A person of ordinary skill in the art may be aware that, in combination with the examples described in embodiments disclosed herein, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of embodiments of this application.

In embodiments of this application, sequence numbers of the foregoing processes/steps do not mean execution sequences. The execution sequences of the processes should be determined based on functions and internal logic of the processes, and should not be construed as any limitation on the implementation processes of embodiments of this application.

In embodiments of this application, the described apparatus embodiment of the terminal 80 is an example. For example, the module/unit division is merely a logical function division, and may be other divisions in actual implementation. For example, a plurality of units or components may be combined or integrated into another system, or some features may be ignored or not performed. In addition, the displayed or discussed mutual coupling or a direct coupling or a communication connection may be implemented by using some interfaces. An indirect coupling or a communication connection between the apparatuses or units may be implemented in an electronic form, a mechanical form, or in another form.

Finally, it should be noted that the foregoing embodiments are merely intended for describing the technical solutions of this application, but not for limiting this application. Although this application is described in detail with reference to the foregoing embodiments, a person of ordinary skill in the art should understand that they may still make modifications to the technical solutions provided in the foregoing embodiments or make equivalent replacements to some technical features thereof, without departing from the spirit and scope of the technical solutions of embodiments of this application.

What is claimed is:

1. A communication system, comprising:

a first terminal; and a second terminal, wherein the first terminal is configured to:

send a first session request message to the second terminal, the first session request message requesting to establish a session between the first terminal and the second terminal, wherein the second terminal is configured to:

send a session response message to the first terminal based on the first session request message, and start a second timer, wherein the first terminal is further configured to:

after receiving the session response message, start a first timer, and based on the first terminal completing first resource reservation for the session before first duration recorded by the first timer reaches preset first duration, send a resource reservation completion acknowledgment message to the second terminal, and wherein the second terminal is further configured to:

after receiving the resource reservation completion acknowledgment message, based on the second terminal completing second resource reservation for the session before second duration recorded by the second timer reaches preset second duration, send a ringing message to the first terminal, wherein the preset second duration is longer than the preset first duration, the first terminal is a calling terminal, and the second terminal is a called terminal.

2. The communication system according to claim 1, wherein the second terminal is further configured to:

based on the second terminal failing to complete the second resource reservation for the session before the second duration recorded by the second timer reaches the preset second duration, send a first session termination message to the first terminal, the first session termination message indicating that the session is terminated.

3. The communication system according to claim 1, wherein the first terminal is further configured to:

based on the first terminal failing to complete the first resource reservation for the session before the first duration recorded by the first timer reaches the preset first duration, send a session cancellation message to the second terminal, the session cancellation message requesting to terminate the session, and wherein the second terminal is further configured to:

send a second session termination message to the first terminal based on the session cancellation message, the second session termination message indicating that the session is terminated.

4. The communication system according to claim 3, wherein the first terminal is further configured to:

after receiving the second session termination message, leave a mobile communication network that is accessed by the first terminal;

access a second mobile communication network that is allowed to be accessed by the first terminal; and send a second session request message to the second terminal through the second mobile communication network, the second session request message requesting to establish a second session between the first terminal and the second terminal.

5. The communication system according to claim 1, wherein the first terminal is further configured to:

after starting the first timer, send a temporary response acknowledgment message to the second terminal, the temporary response acknowledgment message indicating one or more target media types determined by the first terminal.

6. The communication system according to claim 5, wherein the temporary response acknowledgment message further indicates target encoding and decoding modes respectively corresponding to the one or more target media types.

7. The communication system according to claim 5, wherein the second terminal is further configured to:

send a first acknowledgment message to the first terminal, wherein the first acknowledgment message indicates the temporary response acknowledgment message is successfully received by the second terminal.

8. A first terminal, comprising:

a processor; and a non-transitory computer readable storage medium storing programming, the programming including instructions that, when executed by the processor, cause the first terminal to perform operations including:

sending a first session request message to a second terminal, the first session request message requesting to establish a session between the first terminal and the second terminal;

receiving a session response message from the second terminal;

starting a first timer; and based on the first terminal completing first resource reservation for the session before first duration recorded by the first timer reaches preset first duration, sending a resource reservation completion acknowledgment message to the second terminal; and receiving a ringing message from the second terminal, wherein the ringing message is sent by the second terminal based on the second terminal completing second resource reservation for the session before second duration recorded by a second timer reaches preset second duration, wherein the second timer is started by the second terminal after the second terminal receives the first session request message, the preset first duration is shorter than the preset second duration, and the first terminal is a calling terminal.

9. The first terminal according to claim 8, the operations further comprising:

receiving a first session termination message from the second terminal, the first session termination message indicating that the session is terminated, wherein the first session termination message is sent by the second terminal based on the second terminal failing to complete the second resource reservation for the session before the second duration recorded by the second timer reaches the preset second duration.

10. The first terminal according to claim 8, the operations further comprising:

based on the first terminal failing to complete the first resource reservation for the session before the first duration recorded by the first timer reaches the preset first duration, sending a session cancellation message to the second terminal, the session cancellation message requesting to terminate the session; and receiving a second session termination message from the second terminal, the second session termination message indicating that the session is terminated.

11. The first terminal according to claim 10, the operations further comprising:

leaving a mobile communication network that is accessed by the first terminal and accessing a second mobile communication network that is allowed to be accessed by the first terminal; and sending a second session request message to the second terminal through the second mobile communication network, the second session request message requesting to establish a second session between the first terminal and the second terminal.

12. The first terminal according to claim 8, the operations further comprising:

after starting the first timer, sending a temporary response acknowledgment message to the second terminal, wherein the temporary response acknowledgment message indicates one or more target media types determined by the first terminal.

13. The first terminal according to claim 12, wherein the temporary response acknowledgment message further indicates target encoding and decoding modes respectively corresponding to the one or more target media types.

14. The first terminal according to claim 12, the operations further comprising:

receiving a first acknowledgment message from the second terminal, wherein the first acknowledgment message indicates the temporary response acknowledgment message is successfully received by the second terminal.

15. A second terminal, comprising:

a processor; and a non-transitory computer readable storage medium storing programming, the programming including instructions that, when executed by the processor, cause the second terminal to perform operations including:

receiving a first session request message from a first terminal, the first session request message requesting to establish a session between the first terminal and the second terminal;

sending a session response message to the first terminal based on the first session request message;

starting a second timer;

receiving a resource reservation completion acknowledgment message from the first terminal, wherein the resource reservation completion acknowledgment message is sent by the first terminal when the first terminal completes first resource reservation for the session before first duration recorded by a first timer reaches preset first duration, and the first timer is started by the first terminal after the first terminal receives the session response message; and based on the second terminal completing second resource reservation for the session before second duration recorded by the second timer reaches preset second duration, sending a ringing message to the first terminal, wherein the preset second duration is longer than the preset first duration, and the second terminal is a called terminal.

16. The second terminal according to claim 15, the operations further comprising:

based on the second terminal failing to complete the second resource reservation for the session before the second duration recorded by the second timer reaches the preset second duration, sending a first session termination message to the first terminal, the first session termination message indicating that the session is terminated.

17. The second terminal according to claim 15, the operations further comprising:

receiving a session cancellation message from the first terminal, the session cancellation message requesting to terminate the session, wherein the session cancellation message is sent by the first terminal based on the first terminal failing to complete the first resource reservation for the session before the first duration recorded by the first timer reaches the preset first duration; and sending a second session termination message to the first terminal based on the session cancellation message, the second session termination message indicating that the session is terminated.

18. The second terminal according to claim 17, the operations further comprising:

receiving a second session request message from the first terminal, the second session request message requesting to establish a second session between the first terminal and the second terminal, wherein the second session request message is sent by the first terminal through a second mobile communication network after the first terminal leaves a mobile communication network that is accessed by the first terminal and accesses the second mobile communication network that is allowed to be accessed by the first terminal.

19. The second terminal according to claim 15, the operations further comprising:

receiving a temporary response acknowledgment message from the first terminal, the temporary response acknowledgment message indicating one or more target media types determined by the first terminal.

20. The second terminal according to claim 19, the operations further comprising:

sending a first acknowledgment message to the first terminal, the first acknowledgment message indicating the temporary response acknowledgment message is successfully received by the second terminal.

* * * * *